(12) United States Patent
Saito

(10) Patent No.: US 8,411,365 B2
(45) Date of Patent: Apr. 2, 2013

(54) IMAGE-PICKUP DISPLAY DEVICE HAVING OPTICAL ELEMENT PROVIDED WITH DIFFRACTION ELEMENT PORTION

(75) Inventor: Kenichi Saito, Yokohama (JP)

(73) Assignee: Canon Kabushiki Kaisha (JP)

( * ) Notice: Subject to any disclaimer, the term of this patent is extended or adjusted under 35 U.S.C. 154(b) by 359 days.

(21) Appl. No.: 12/904,465

(22) Filed: Oct. 14, 2010

(65) Prior Publication Data

US 2011/0090389 A1   Apr. 21, 2011

(30) Foreign Application Priority Data

Oct. 15, 2009   (JP) ................................. 2009-238771

(51) Int. Cl.
*G02B 27/14* (2006.01)

(52) U.S. Cl. .................. 359/631; 348/115; 348/333.01; 348/335; 359/630

(58) Field of Classification Search ........................ None
See application file for complete search history.

(56) References Cited

U.S. PATENT DOCUMENTS

| | | | | |
|---|---|---|---|---|
| 5,917,656 A * | 6/1999 | Hayakawa et al. | ........... | 359/637 |
| 5,933,279 A | 8/1999 | Yamazaki | | |
| 5,995,291 A * | 11/1999 | Togino | ........................... | 359/631 |
| 6,646,811 B2 * | 11/2003 | Inoguchi | ........................ | 359/631 |
| 6,980,363 B1 | 12/2005 | Takagi et al. | | |
| 8,174,569 B2 * | 5/2012 | Tanijiri et al. | .................. | 348/115 |
| 2003/0034935 A1 * | 2/2003 | Amanai et al. | ..................... | 345/7 |
| 2004/0085647 A1 * | 5/2004 | Inoguchi | ........................ | 359/631 |
| 2005/0068314 A1 * | 3/2005 | Aso et al. | ....................... | 345/419 |
| 2007/0247730 A1 * | 10/2007 | Yamazaki et al. | ............. | 359/858 |

FOREIGN PATENT DOCUMENTS

| | | |
|---|---|---|
| JP | 10-239628 A | 9/1998 |
| JP | 3604990 B2 | 12/2004 |

* cited by examiner

*Primary Examiner* — Chieh M Fan
*Assistant Examiner* — Dwight C Tejano
(74) *Attorney, Agent, or Firm* — Rossi, Kimms & McDowell LLP

(57) ABSTRACT

An image-pickup display device includes an optical system which guides lights from a display element 1 to an exit pupil 3 and from an external to an image-pickup element 2. The optical system includes an optical element 10 which is filled with a medium having a refractive index larger than 1. The optical element includes a first surface 7 at an external side and includes a diffraction element portion 13. The optical system guides the light from the display element to the exit pupil via reflection on a second surface 5 and the first surface and via transmission on the second surface, and diffracts the light from the external in the diffraction element portion to be transmitted through the first surface to enter the optical element, and is reflected on the second surface to be transmitted through a third surface 5 to be guided to the image-pickup element.

3 Claims, 5 Drawing Sheets

IMAGE-PICKUP DISPLAY DEVICE HAVING OPTICAL ELEMENT PROVIDED WITH DIFFRACTION ELEMENT PORTION

BACKGROUND OF THE INVENTION

1. Field of the Invention

The present invention relates to an image-pickup display device that is a video see-through head mounted display (HMD) which is mounted on a head of a viewer and displays an image obtained by taking an external image to view it.

2. Description of the Related Art

Japanese Patent Laid-open No. H10-239628 and Japanese Patent No. 3604990 disclose the video see-through HMD as described above. The HMD includes a first prism that constitutes a displaying optical system which guides light from a display element displaying an original image to an exit pupil, i.e. the eye of a viewer, and a second prism that is disposed at an external side of the first prism and that reflects the light from the external to bend its optical path. The second prism forms an image-pickup optical system which is different from the displaying optical system, and guides the light from the external to the image-pickup element. Japanese Patent Laid-open No. H10-239628 discloses an example in which the second prism is joined on a surface at the external side of the first prism, and Japanese Patent No. 3604990 discloses an example in which the second prism is disposed at the external side of the first prism with a space.

In both the HMDs disclosed in Japanese Patent Laid-open No. H10-239628 and Japanese Patent No. 3604990, an optical axis of the image-pickup optical system is equal to a view axis of a viewer who looks into the displaying optical system. Therefore, the external image obtained by taking the external optical image using an image-pickup element is displayed on the display element as an original image so that the viewer can view substantially the same external image as that viewed by the naked eye via the displaying optical system. The external image and a computer graphics image are synthesized to be able to display them on the display element as if an object that does not really exist were in a space in front of the eye.

However, in each of the HMDs disclosed in Japanese Patent Laid-open No. H10-239628 and Japanese Patent 3604990, the displaying optical system and the image-pickup optical system are formed by completely different prisms, i.e. first and second prisms. Additionally, the first and second prisms have substantially the same size. Therefore, its weight increases as the size of the HMD is enlarged.

Especially, in the HMD disclosed in Japanese Patent No. 3604990, a position of the second prism is displaced with respect to the first prism due to a manufacturing error, a feeling of incongruity is given to the viewer because the displacement between the displayed external viewed via the displayed image and the real external or the position displacement of the CG image with respect to the displayed external becomes marked.

SUMMARY OF THE INVENTION

The present invention provides an image-pickup display device (a video see-through HMD) which is compact and lightweight and is capable of viewing an image without a feeling of incongruity.

An image-pickup display device as one aspect of the present invention includes a display element configured to display an original image, an image-pickup element configured to convert an optical image into an electric signal, and an optical system configured to guide light from the display element to an exit pupil and guide light from an external to the image-pickup element. The image-pickup display device displays an image generated based on an output of the image-pickup element as the original image on the display element. The optical system includes an optical element in which an area inside at least three optical surfaces is filled with a medium having a refractive index larger than 1. The optical element includes a half mirror surface as a first surface at an external side of the at least three optical surfaces and includes a diffraction element portion at the external side of the first surface. The optical system is configured to guide the light from the display element to the exit pupil via reflection on a second surface closest to the exit pupil of the at least three optical surfaces and the first surface and via transmission on the second surface, and is configured to diffract the light from the external in the diffraction element portion to be transmitted through the first surface to enter the optical element, and to be reflected on the second surface to be transmitted through a third surface different from the first and second surfaces to be emitted from the optical element to be guided to the image-pickup element.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. First of all, a basic concept of an embodiment of the present invention will be described.

Figure 1:
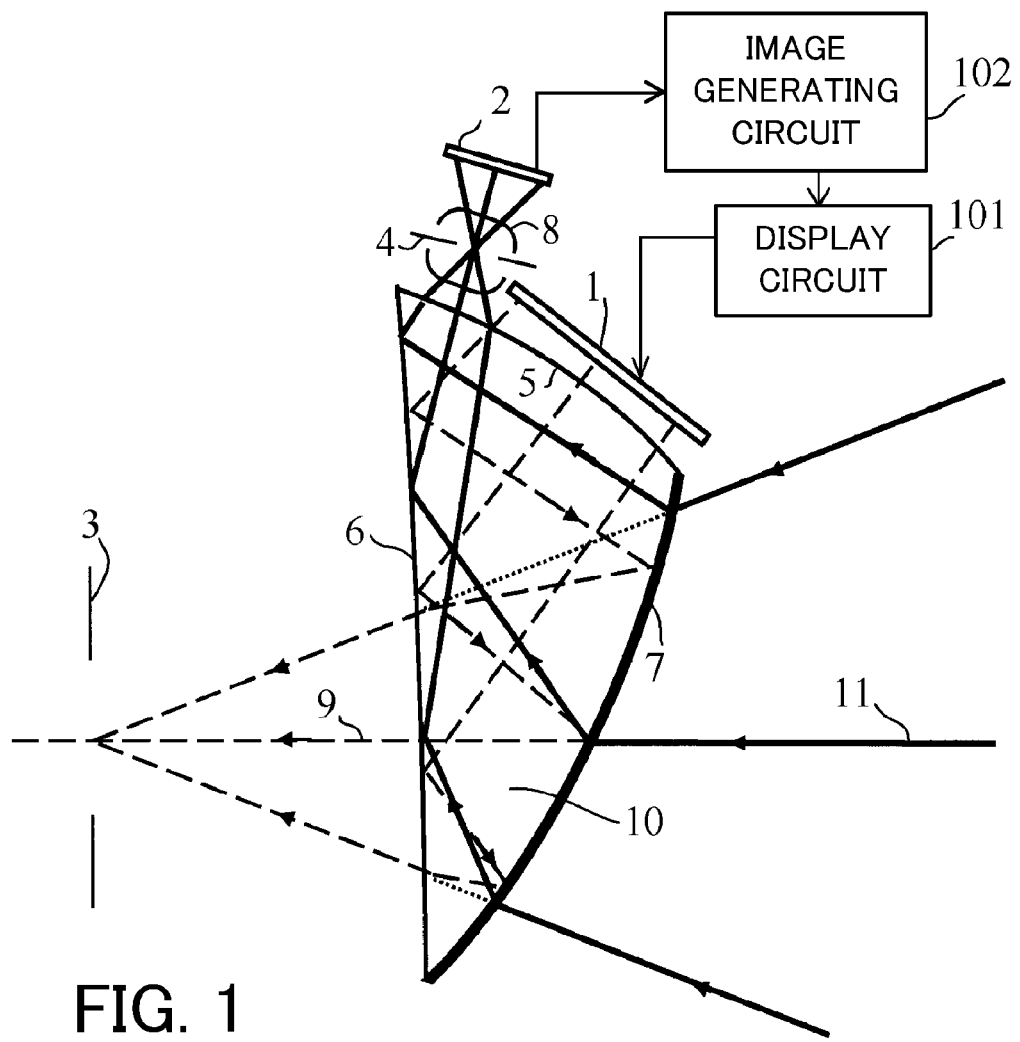
FIG. 1 is a diagram of a basic concept of an HMD that is an embodiment of the present invention.

FIG. 1 illustrates a configuration of a video see-through HMD (an image-pickup display device) that is an embodiment of the present invention.

Reference numeral 10 denotes a prism as an optical element, which includes a surface (a third surface) 5, a surface (a second surface) 6, and a surface (a first surface) 7, and the insides of these three optical surfaces 5 to 7 are filled with a transmissive medium having a refractive index n larger than 1. The surface 7 is an external side surface, i.e. a surface facing the external, and the surface 6 of the three surfaces 5 to 7 is a surface that is the closest to (faces) an exit pupil 3 at which the eye of a viewer (not shown) is disposed. The surface 5 is a surface different from the surfaces 6 and 7, and faces a display element 1. The display element 1 is constituted of a liquid crystal panel, an organic EL element, or the like, which is driven by a display circuit 101 to display an original image.

Light (image light which is indicated by a dotted line in FIG. 1) 9 from the display element 1 (the original image) is refracted on the surface 5 of the prism 10 to enter the prism 10 to propagate the inside of the prism 10 to the surface 6. Rays which form any angles of field of the image light 9 also enter the surface 6 at an incident angle larger than $\tan^{-1}(1/n)$ with respect to the surface 6, and are totally reflected on the surface 6 to the surface 7, i.e. a total internal reflection is performed on the surface 6.

The surface 7 is a half mirror surface for which a half mirror process has been performed. The image light 9 from the surface 6 is reflected on the surface 7 to enter the surface 6 again. The image light 9 which has entered the surface 6 again transmits through the surface 6 while being refracted at the surface 6 to be emitted from the prism 10 to be guided to the exit pupil 3. The surfaces 5 to 7 are constituted of a curved surface such as a spherical surface or an irrotational symmetric surface, which forms an enlarged image of the original image by the image light 9 to display it on the exit pupil 3.

On the other hand, light from the external (external light which is indicated by a solid line in FIG. 1) 11 heads to the surface 7, and a blazed diffraction element portion (hereinafter, referred to as a DOE layer) is provided integrally with the prism 10 at the external side of the surface 7.

The external light 11 is diffracted in a predetermined direction in the DOE layer at a predetermined diffraction order. The diffracted external light 11 transmits through the surface 7 of the prism 10 to enter the prism 10 to the surface 6. Each ray to the surface 6 enters the surface 6 at an incident angle larger than $\tan^{-1}(1/n)$ with respect to the surface 6 to be totally reflected on the surface 6 to the surface 5. Then, the external light 11 transmits through the surface 5 to be emitted from the prism 10 to be guided to an image-pickup element 2. However, in FIG. 1, an image-forming optical system 8 is disposed between the surface 5 and the image-pickup element 2, and the external light 11 from the surface 5 is guided to an entrance pupil 4 of the image-forming optical system 8 before reaching the image-pickup element 2. An external optical image that has been formed by the external light 11 is formed on an imaging plane of the image-pickup element 2.

The image-pickup element 2 is constituted of a CCD sensor, a CMOS sensor, or the like, which converts the external optical image into an electric signal, i.e. takes an image, and inputs the output to an image generating circuit 102. The image generating circuit 102 generates an external image displayed as an original image on the display element 1 via the display circuit 101. A computer graphics (CG) image is inputted from the external to the display circuit 101. The display circuit 101 can also display the original image which is obtained by synthesizing the CG image and the external image.

In the HMD configured as above, the single prism 10 is shared as at least apart of the displaying optical system which guides the image light 9 to the exit pupil 3 and the image-pickup optical system which guides the external light 11 to the image-pickup element 2 (the image-forming optical system 8). Thus, compared with a case where the displaying optical system and the image-pickup optical system are constituted using different prisms, a compact-sized and light-weight HMD can be realized. Furthermore, a feeling of incongruity of an image caused by a position displacement between prisms due to a manufacturing error which often occurs when using different prisms is not given to the viewer. Additionally, because the DOE layer is provided integrally with the prism 10, only the external light in the angle of field can be diffracted in the DOE layer to be guided to the image-pickup element 2.

All the external lights 11 which have entered the inside of the angle of field of the displaying optical system head to the image-pickup element 2, and do not directly reach the exit pupil 3 (the eye). Therefore, even if a light shielding member or a light shielding layer which shields the external light 11 to the exit pupil 3 is not disposed, only the enlarged image of the original image which has been displayed on the display element 1 can be viewed by the viewer.

The entrance pupil 4 of the image-forming optical system 8 may be disposed at a position optically equivalent to that of the exit pupil 3 of the displaying optical system, or may also be disposed at a position which is intentionally displaced at a predetermined amount considering a perception characteristic of a human being. The displacement is appropriately set to be able to reduce the difference between the visibilities in the views of the external image via the displaying optical system and by the naked eye.

Figure 2:
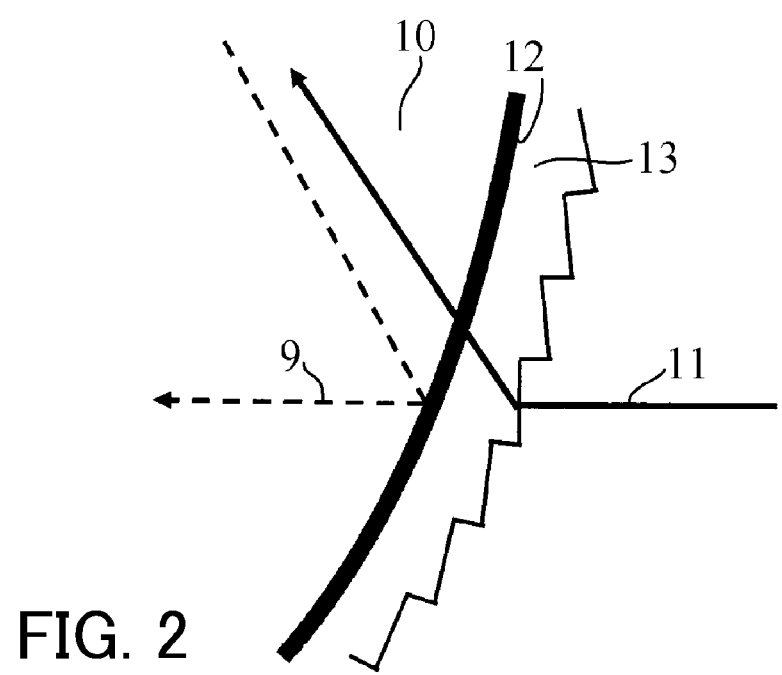
FIG. 2 is a diagram of a DOE surface in the embodiment of FIG. 1.

Next, the surface 7 that is a half mirror surface and that has the DOE layer formed at its external side will be described in more detail. FIG. 2 is an enlarged diagram of a part of the surface 7. Reference numeral 12 denotes a half mirror layer which is formed by evaporating a half mirror film on an external surface of the surface 7 of the prism 10, and reference numeral 13 denotes a DOE layer which is joined on the external surface of the half mirror layer 12. The DOE layer 13 may be formed by the same medium material as that of the prism 10, or may also be formed by a different medium material.

The image light 9 which has been propagated in the prism 10 from the display element 1 is reflected on the back surface of the half mirror layer 12 to the surface 6 illustrated in FIG. 1 and the exit pupil 3. On the other hand, the external light 11 is diffracted by the DOE layer 13 to a direction of the surface 6, and is reflected on the surface 6 as described above to transmit through the surface 5 to be finally guided to the image-pickup element 2.

A diffractive power of the DOE layer 13 is strong in an in-plane direction of the paper in FIGS. 1 and 2, i.e. in an in-plane direction of a surface including the image light 9 and reference ray of the external light, and is weak in a direction perpendicular to the paper. The reference ray means a principal ray which reaches a center of the exit pupil 3 of the displaying optical system from a center of the display element 1 (the original image) or a principal ray which passes through a center of the entrance pupil of the image-pickup optical system to reach a center of the image-pickup element 2 (the imaging plane). In this case, a zone of the DOE layer 13 has a shape similar to a straight line which extends in a direction perpendicular to the paper. The height of the grating is set so that the diffraction efficiency is the highest at a predetermined set diffraction order.

Figure 3:
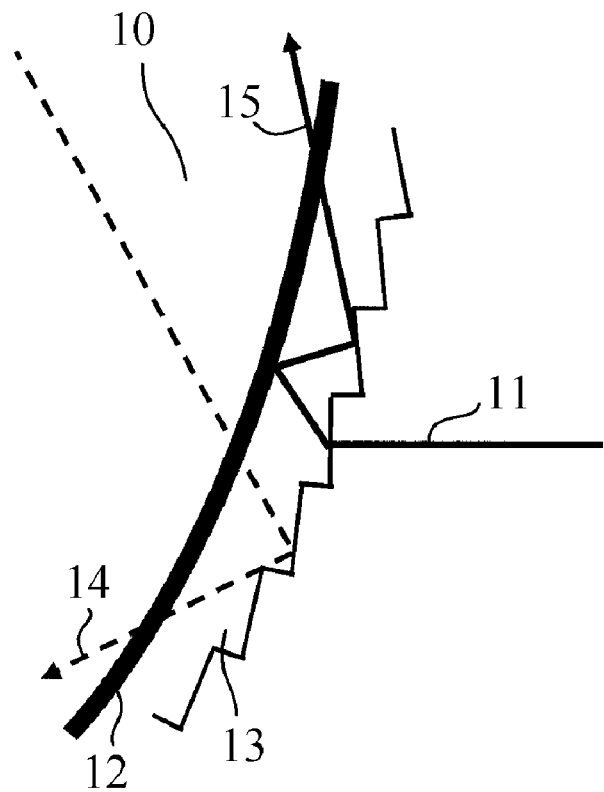
FIG. 3 is a diagram of unnecessary light that is generated by a half mirror.

In the embodiment, since the half mirror layer 12 is formed on the surface 7, the propagation of the unnecessary light will be described with reference to FIG. 3.

The image light 9 entering the surface 7 from the display element 1 contains light that transmits through the half mirror layer 12. Almost all of the lights transmit through the DOE layer 13 and are diffracted to be emitted to the external, but light 14 that is a part of the lights is reflected and diffracted on the DOE layer 12 to return to the inside of the prism 10. However, the light 14 is, as illustrated in FIG. 3, diffracted by the DOE layer 12 in a direction extremely different from that of the exit pupil 3 and therefore it does not reach the exit pupil 3. Since the light 14 passes through the half mirror layer 12 twice, the light intensity is minute and it does not matter.

The external light 11 entering the surface 7 via the DOE layer 13 from the external also contains lights which are reflected on the half mirror layer 12. Almost all of the lights reflected on the half mirror layer 12 transmit through and are diffracted by the DOE layer 13 to be emitted to the external, but light 15 that is a part of the lights is reflected and diffracted on the DOE layer 13 to return to the inside of the prism 10. However, the light 15 is also diffracted in a direction extremely different from that of the entrance pupil 4 of the image-forming optical element 8 and therefore it does not reach the exit pupil 3. The light intensity is also minute and it does not matter.

In the present embodiment, it is preferable that a surface including the reference ray of the displaying optical system and a surface including the reference ray of the image-pickup optical system is equal to each other.

Figure 4:
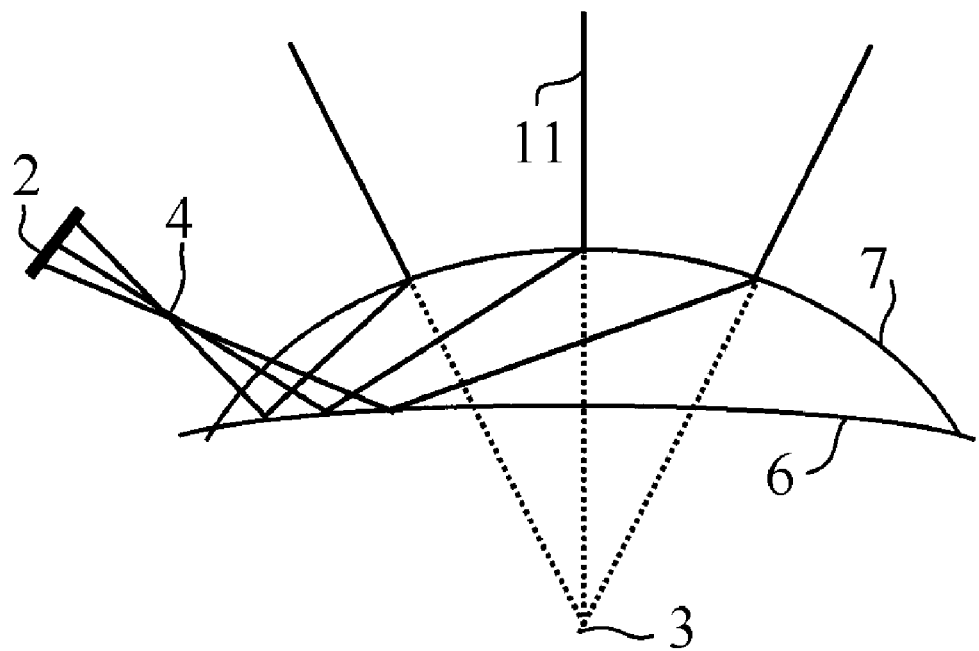
FIG. 4 is a diagram illustrating an example of a diffracted direction of external light.

When the prism 10 has a shape surrounded by the three surfaces 5 to 7, some options relating to the arrangement positions of the image-pickup element 2 and the image-forming optical system 8 can be given. In the embodiment, for example as illustrated in FIG. 4, a case in which the external light 11 is diffracted in a direction nonparallel to the plane including the reference ray of the displaying optical system is considered. In this case, since the image-pickup element 2 and the display element 1 are not closely positioned, these interferences do not have to be considered. However, as understood by FIG. 4, in order to meet a condition which the external light 11 is totally reflected on the surface 6, the diffractive power of the DOE layer 13 has to be considerably enlarged, and in order to ensure an optical path in the prism 10, the diameter of the prism 10 also needs to be enlarged.

On the other hand, when the plane including the reference ray of the displaying optical system and the surface including the reference ray of the image-pickup optical system are equal to each other as illustrated in FIG. 1, the size of the prism 10 can be suppressed.

In the present embodiment, it is preferable that the diffraction efficiency of diffracted light having n-th order which meets n<−2 or +2<n in the DOE layer 13 is higher than that of diffracted light having an order other than the n-th order. In other words, it is preferable that parameters of the DOE layer 13 such as a grating pitch or a grating height are set so that the diffraction efficiency of the diffracted light having the n-th order is maximized.

When the optical system as illustrated in FIG. 1 is realized, a diffraction angle on the DOE layer 13 needs to be enlarged. Generally, the DOE uses first order diffracted light as used order light in many cases. However, the diffraction angle is enlarged by the first order diffracted light, the coefficient of a phase function has to be increased in order to strengthen the diffractive power. As a result, the grating pitch is extremely narrowed and therefore it is difficult to form the grating. Accordingly, it is difficult to maximize the diffraction efficiency of the first order diffracted light to decrease the diffraction efficiency of diffracted light having an unnecessary order.

In the present embodiment, diffracted light having an order higher than second order is used to relieve the diffractive power to suppress the decrease of the grating pitch.

In FIG. 1, the HMD in which the prism 10 having the three optical surfaces of the surfaces 5 to 7 is used is illustrated. However, the prism only has to have at least three optical surfaces, and for example it may also have four optical surfaces.

Figure 5:
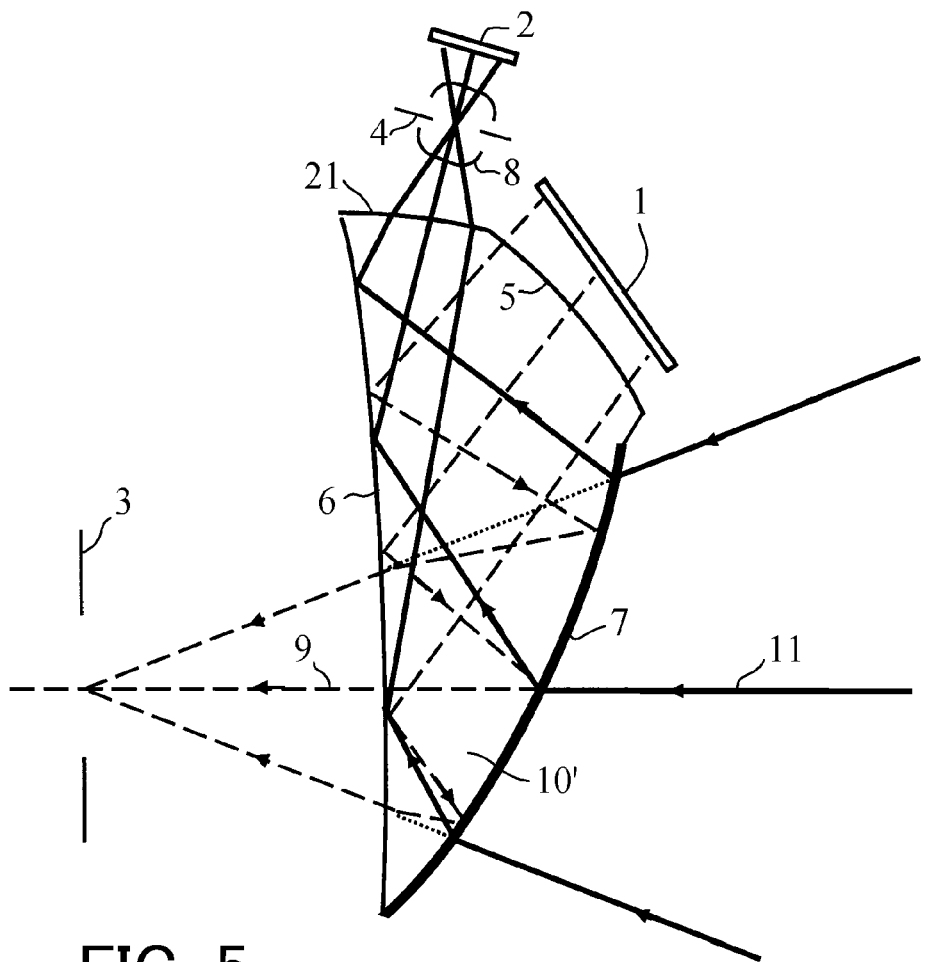
FIG. 5 is a diagram illustrating a modified example of the embodiment of FIG. 1.

In FIG. 5, a prism 10' has four optical surfaces of the surface 7 having the DOE layer which the external light enters, the surface 6 closest to the exit pupil, the surface 5 which the image light 9 from the display element 1 enters, and a surface 21 from which the external light 11 is emitted to the image-pickup element 2.

When the prism 10 has the three optical surfaces 5 to 7 as illustrated in FIG. 1, it is necessary to dispose the image-pickup element 2 closely to the displaying element 1 in some cases. In contrast, when the prism 10' has the four optical surfaces 5 to 7, and 21 as illustrated in FIG. 5, an angle is provided between the surface 5 and the surface 21 adjacent to the surface 5 to be able to make each of them independent surface. Therefore, the image-pickup element 2 can be disposed away from the display element 1 properly. Furthermore, each of the refractive powers of the surfaces 5 and 21 can be independently set. Thus, the degree of freedom of the design is improved and the reduction in size and the improvement of the performance can be performed.

A light shielding portion such as a light shielding member or a light shielding layer for preventing the unnecessary external light from an outside of an effective angle of field of the image-pickup optical system from reaching the exit pupil 3 (the eye) may also be provided on or near the surface 7 at the external side.

Figure 6:
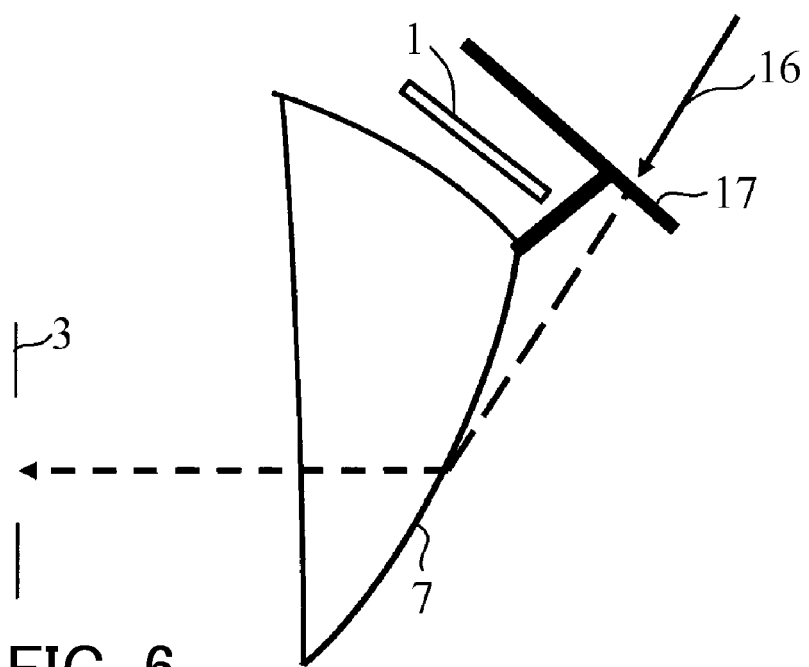
FIG. 6 is a diagram of an example in which a light shielding member is provided.

In the previous description relating to the HMD of FIG. 1, basically, the light shielding portion does not have to be provided. However, in accordance with the design, the external light from the direction extremely different from the effective angle of field of the image-pickup optical system may head to the exit pupil 3. For example, when the DOE layer having the power as illustrated in FIG. 1 is provided, as illustrated in FIG. 6, light 16 entering the surface 7 from a direction close to the display element 1 is diffracted on the DOE layer to the exit pupil 3 in some cases. In this case, it looks like the external light is overlapped with the image light from the display element 1. The light leaked in a direction of the surface 7 from the display element 1 or its back light (when the display element 1 is a liquid crystal panel) may also head to the exit pupil 3.

In order to avoid this, it is preferable that the light shielding member 17 is provided as illustrated in FIG. 6. The light shielding member 17 shields the light that is diffracted on the surface 7 to the exit pupil 3 so that only the image light from the display element 1 is guided to the exit pupil 3. In this case, the light shielding member 17 may also be used as a housing of the HMD. An antireflection process to prevent a positive reflection or a random reflection may be performed on a surface of the light shielding member 17.

Figure 7:
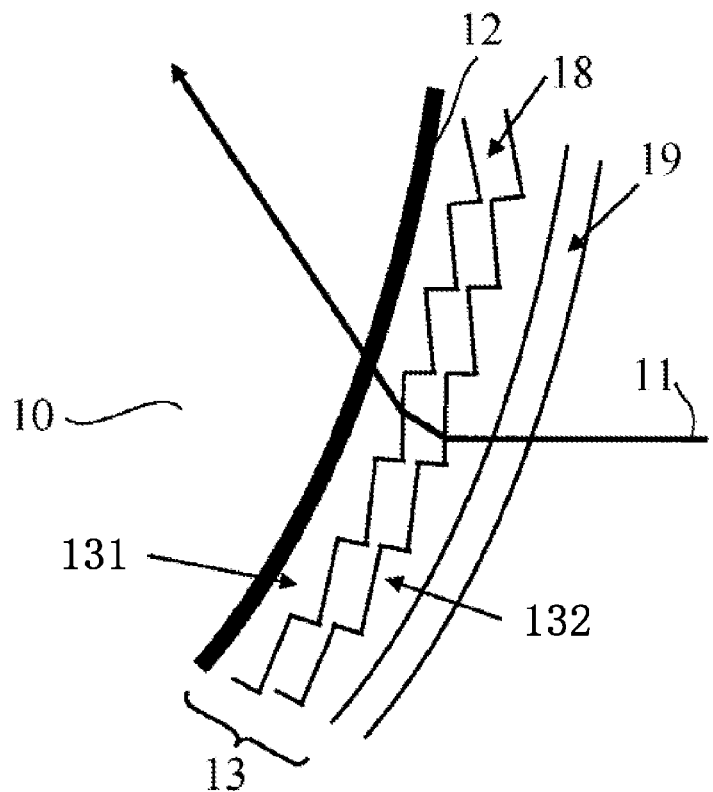
FIG. 7 is a diagram illustrating an example in which a multilayer DOE is used.

As illustrated in FIG. 7, the DOE layer 13 may also be configured as a multilayer DOE in which a plurality of diffraction gratings 131 and 132 formed by different media from each other are stacked. A single-layer DOE can obtain high diffraction efficiency only at a specific design wavelength, but in other wavelength ranges the diffraction efficiency is low and unnecessary flare may be generated. Therefore, it is preferable that the multilayer DOE which can obtain high diffraction efficiency in a wide wavelength range is adopted as the DOE layer 13 to suppress the generation of the flare to be able to perform a good image viewing.

In FIG. 7, the DOE layer 13 is constituted of a first diffraction grating layer 131 and a second diffraction grating layer 132. The first diffraction grating layer 131 is formed on the half mirror layer 12, and the second diffraction grating layer 132 is formed on a substrate 19 different from the half mirror layer 12. The first and second diffraction grating layers 131 and 132 are closely disposed via an air space 18. The first diffraction grating layer 131 has a positive power, and the second diffraction grating layer 132 has a negative power.

The grating height of each diffraction grating layer is set for each grating so that high diffraction efficiency can be obtained in a wavelength range as wide as possible. In other words, the grating height of each diffraction grating layer varies in accordance with its position in the layer.

In the embodiment, the following expression is met, where M is a diffraction order of the DOE layer 13, M1 is a diffraction order of the first diffraction grating layer 131, and M2 is a diffraction order of the second diffraction grating layer 132.

$$M=M1+M2$$

Figure 8:
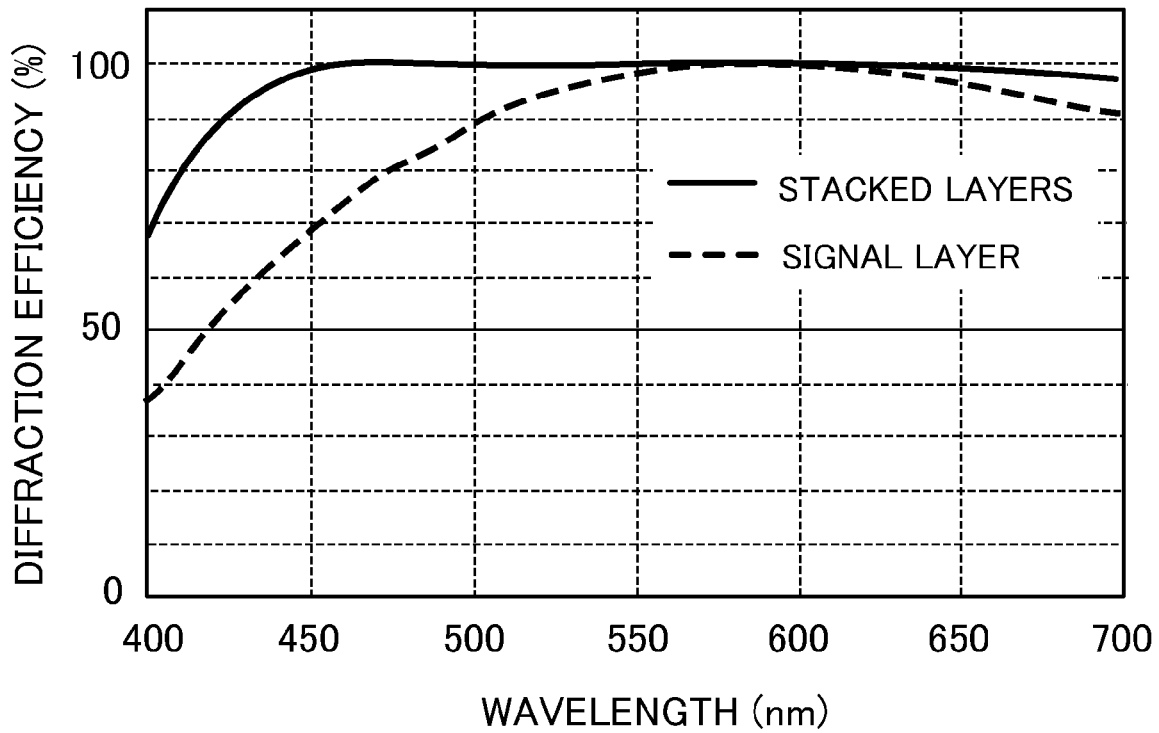
FIG. 8 is a graph illustrating diffraction efficiencies of a multilayer DOE and a single-layer DOE.

FIG. 8 illustrates an example of wavelength dependencies of the diffraction efficiencies of the multilayer DOE and the single-layer DOE which are designed as above. A refractive index n1 ($\lambda_d$) of a medium material which forms the first diffraction grating layer 131 is 1.52415, and a refractive index n2 ($\lambda_d$) of a medium material which forms the second diffraction grating layer 132 is 1.63554. In the embodiment, the wavelength $\lambda_d$ is 587.6 nm.

In the example illustrated in FIG. 7, the air space is provided between the two diffraction grating layers, but the number of the multilayer layers may also be three or more or the two layers may also directly contact each other without providing the air space between the two layers.

Figure 9:
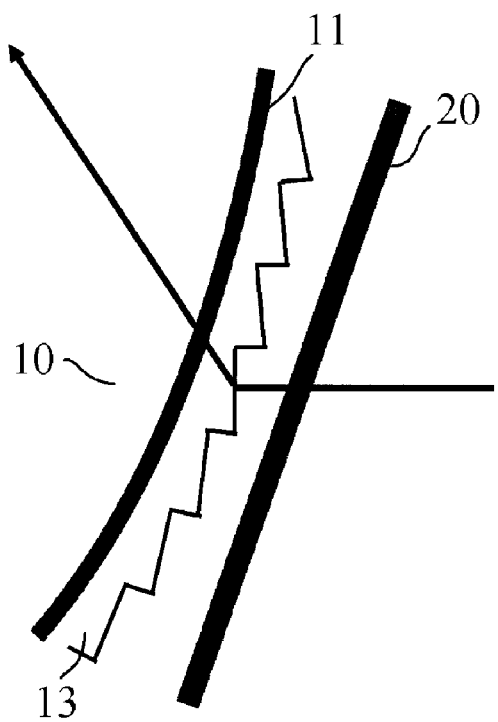
FIG. 9 is a diagram illustrating an example in which a color filter is used.

In addition, as illustrated in FIG. 9, a color filter 20 which only transmits light having a specific wavelength may also be provided at the external side of the DOE layer 13. Even if the DOE layer 13 is the multilayer DOE as well as the single-layer DOE, a wave range in which high diffraction efficiency cannot be obtained may exist in accordance with a designed condition. In the graph of FIG. 8, the diffraction efficiency is decreased in a short wavelength range shorter than 450 nm and in a long wavelength range longer than 650 nm. Because the visibility in these wavelength ranges is low and a flare is not easily recognized, there is no problem even if the flare is generated. However, the problem may occur when the wavelength range in which the diffraction efficiency is decreased is extended up to the wavelength range in which the flare is easily recognized.

In this case, it is preferable that the color filter 20 in which the transmittance of the wavelength range having a low diffraction efficiency is decreased is provided to shield the light in the wavelength range having the low diffraction efficiency to suppress the generation of the flare. When the color filter 20 influences the color reproducibility of an image generated by taking the image, the generated image has only to be corrected in accordance with spectral characteristics of the color filter 20. The color filter 20 may be formed as a multilayer film on a surface at the external side of the DOE layer 13, or may also be held by the housing of the HMD to be formed on a cover glass for protecting the optical system and the like inside the housing.

When a black-and-white image is generated by taking the image, the single-layer DOE and the color filter which only transmits the wavelength near the peak wavelength of the diffraction efficiency are used to be able to prevent the generation of the flare.

The original image generated using the whole or a part of image information obtained by taking the image may also be displayed on the display element 1 without providing the image-pickup element 2 with a function that shields an infrared wavelength. The HMD of the present embodiment can also be used as an infrared scope. Sensitivity for the infrared range is given to the image-pickup element 2 without providing the image-pickup element 2 with an infrared cut filter to be able to take a dark-field image. The image having a plurality of colors or a single color is displayed on the display element 1 to be able to view the dark-field image which cannot be seen by the naked eye in real time. Since the infrared scope of the present embodiment is compact and lightweight as compared with a conventional one, the burden of the viewer who wears it for a long time is reduced.

The image information obtained by taking the image using the infrared scope may be entirely displayed on the display element 1, or only a feature that is a part of the image information may also be extracted to calculate a position of the viewer to display a CG image in a prepared field range after adjusting the position adapted for the viewpoint of the viewer. In this case, in accordance with its usage, a filter that transmits only the infrared light may also be provided as the color filter described above.

Figure 10:
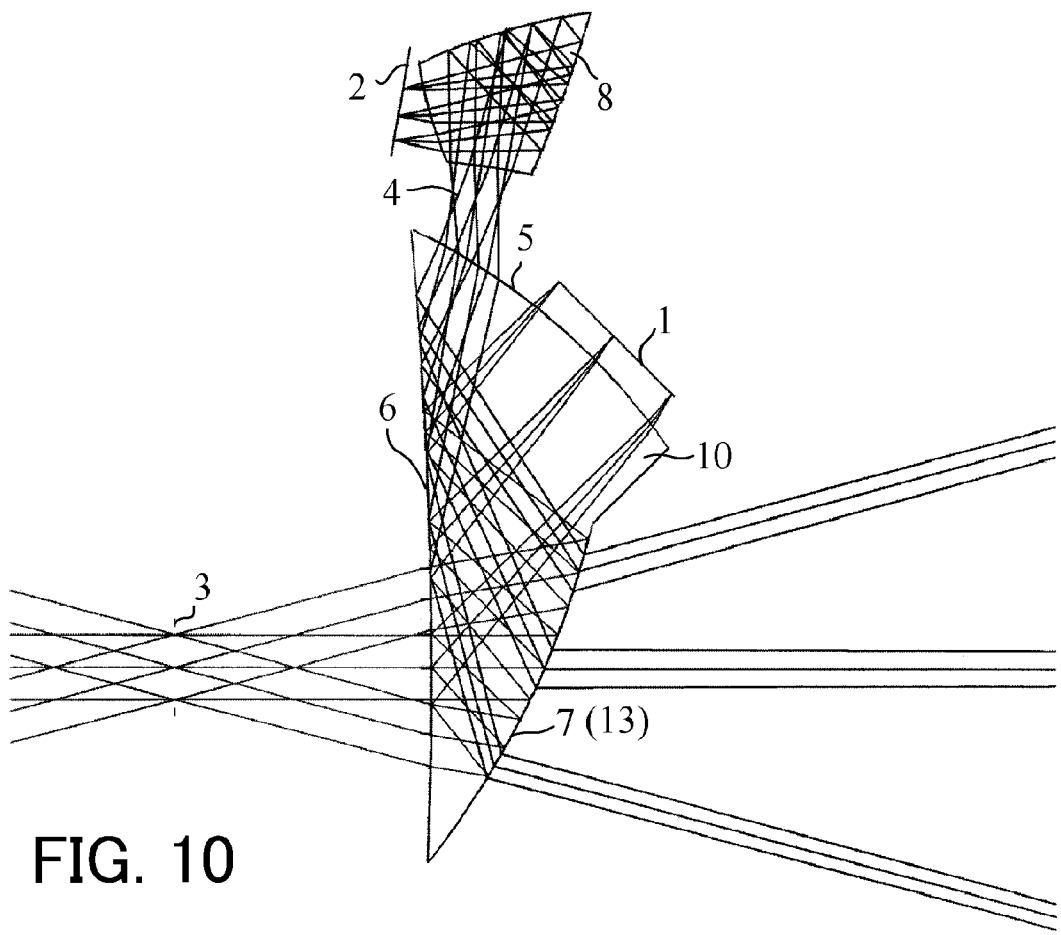
FIG. 10 is a diagram illustrating an HMD as a numerical example of the present invention.

FIG. 10 illustrates a numerical example of the embodiment illustrated in FIG. 1.

The external light is diffracted by the DOE layer 13 formed on the surface 7 to enter the prism 10 to the surface 6 of the prism. The refractive index $n_d$ of the medium material that fills the inside of the prism 10 is 1.5709. The external light enters the prism 10 at an incident angle $\theta_i$ that meets $\theta_i > \tan^{-1}(1/n)$ with respect to the surface 6 and is totally reflected on the surface 6 to be emitted to the outside of the prism 10. The emitted external light passes through the entrance pupil 4 of the image-forming optical system 8 formed by an extremely-small prism as compared with the prism 10 to be imaged on the image-pickup element 2.

The image light from the display element 1 (the original image) enters the prism 10 from the surface 5 of the prism 10 to the surface 6. The image light enters the prism 10 at the incident angle $\theta_i$ that meets $\theta_i > \tan^{-1}(1/n)$ with respect to the surface 6 to be totally reflected by the surface 6 to the surface 7. Then, the image light is reflected on the half mirror surface 7 to enter the surface 6 again, and is emitted from the surface 6 to the outside of the prism 10 to reach the exit pupil 3.

Optical parameters in the numerical example will be indicated below. In the embodiment, the optical parameters are indicated by performing a reverse ray trace in which an object surface is set at a virtual image position, a pupil is set at an exit pupil, and an image plane is set at a display surface of the display element 1. The coordinates are given as follows. A center of the exit pupil 3 is set to be an original point, a visual axis from the original point to the displaying optical system is set to be a Z-axis, and its direction is set to be a positive. A direction orthogonal to the Z-axis and parallel to a cross section including a reference ray (upward and downward direction viewed from the viewer) is set to be a Y-axis direction. An axis orthogonal to a YZ plane and having a positive direction from right to left viewed from the pupil side is set to be an X-axis. The coordinate of each surface is displayed as a position at a surface top with respect to the original point. A decentering amount is set to be an angle rotated in a counter-clockwise direction around the X-axis with respect to an XY plane.

| Surface number | Radius of curvature | Y position | Z position | Refractive index | Decentering amount θ |
|---|---|---|---|---|---|
| Object | ∞ | 0.000 | −1393.000 | | |
| 1: (Pupil) | ∞ | 0.000 | 0.000 | | |
| 2: | ∞ | 0.000 | 15.000 | | |
| 3: | −360.000 | −3.000 | 19.000 | 1.57090 | |
| 4: | −65.000 | 0.000 | 26.000 | 1.57090 (Reflection) | −26.000° |

-continued

| Surface number | Radius of curvature | Y position | Z position | Refractive index | Decentering amount θ |
|---|---|---|---|---|---|
| 5: | −360.000 | 0.000 | 19.000 | 1.57090 (Reflection) | |
| 6: | −50.000 | 31.000 | 20.500 | | 60.000° |
| 7: | ∞ | 12.111 | 43.814 | | 45.000° |
| Image plane: | ∞ | 12.677 | 44.384 | | 45.000° |

In the embodiment, a pupil diameter is φ6 mm, and an angle of field is ±15° in an in-plane direction of the paper and is ±20° in a direction perpendicular to a plane of the paper.

Next, optical parameters of the image-pickup optical system will be indicated below. The coordinates are the same as those of the displaying optical system, and the surfaces 1, 2, and 3 of the image-pickup optical system are identical to the surfaces 4, 3(5), and 6 of the displaying optical system, respectively.

| Surface number | Radius of curvature | Y position | Z position | Refractive index | Decentering amount θ |
|---|---|---|---|---|---|
| Object | ∞ | 0.000 | −491.500 | | |
| 1: | 65.000 | −3.000 | 26.000 | 1.57090 (DOE) | −26.000° |
| 2: | 360.000 | 0.000 | 19.000 | 1.57090 (Reflection) | 60.000° |
| 3: | 50.000 | 31.000 | 20.500 | | |
| 4: (Pupil) | ∞ | 34.726 | 22.389 | | 72.000° |
| 5: | 80.000 | 37.104 | 23.162 | 1.57090 | 82.000° |
| 6: | 45.000 | 45.583 | 20.314 | 1.57090 (Reflection) | 112.000° |
| 7: | −90.000 | 40.038 | 27.947 | 1.57090 (Reflection) | 158.000° |
| 8: | 30.000 | 60.492 | 20.033 | | 158.000° |
| Image plane: | ∞ | 66.505 | 21.168 | | 170.000° |

In the embodiment, the angle of field of the image-pickup optical system is the same as that of the displaying optical system, and an incident diameter is φ3 mm.

The DOE layer 13 is set so that the diffracted external light propagates the optical path as described above, and in the designed wavelength of $\lambda_d$=587.56 nm, its equivalent phase function is represented as follows.

$$\phi(y)C_1 y+C_2 y^2+C_3 y^3+C_4 y^4$$

$C_1$=−0.286
$C_2$=−1.101·10$^{-3}$
$C_3$=−1.098·10$^{-6}$
$C_4$=−6.010·10$^{-7}$

The diffraction order is −5th order, and the height of each grating is set so that the scalar diffraction efficiency of the diffraction order indicates 100% in the designed wavelength $\lambda_d$.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-238771, filed on Oct. 15, 2009, which is hereby incorporated by reference herein in its entirety.

What is claimed is:

1. An image-pickup display device comprising:
a display element configured to display an original image;
an image-pickup element configured to convert an optical image into an electric signal; and
an optical system configured to guide light from the display element to an exit pupil and guide light from an external to the image-pickup element,
wherein the image-pickup display device displays an image generated based on an output of the image-pickup element as the original image on the display element,
wherein the optical system includes an optical element in which an area inside at least three optical surfaces is filled with a medium having a refractive index larger than 1,
wherein the optical element includes a half mirror surface as a first surface at an external side of the at least three optical surfaces and includes a diffraction element portion at the external side of the first surface, and
wherein the optical system is configured to guide the light from the display element to the exit pupil via reflection on a second surface closest to the exit pupil of the at least three optical surfaces and the first surface and via transmission on the second surface, and is configured to diffract the light from the external in the diffraction element portion to be transmitted through the first surface to enter the optical element, and to be reflected on the second surface to be transmitted through a third surface different from the first and second surfaces to be emitted from the optical element to be guided to the image-pickup element.

2. An image-pickup display device according to claim 1, wherein a diffraction efficiency of n-th order diffracted light which meets n<−2 or +2<n is higher than that of diffracted light having an order other than the n-th order in the diffraction element portion.

3. An image-pickup display device according to claim 1, wherein the diffraction element portion is configured by stacking a plurality of diffraction gratings which are formed by media different from each other.

* * * * *